(12) United States Patent
Batchko

(10) Patent No.: US 10,432,398 B1
(45) Date of Patent: Oct. 1, 2019

(54) PRIME NUMBER PREDICTION

(71) Applicant: Robert G. Batchko, Redondo Beach, CA (US)

(72) Inventor: Robert G. Batchko, Redondo Beach, CA (US)

( * ) Notice: Subject to any disclaimer, the term of this patent is extended or adjusted under 35 U.S.C. 154(b) by 504 days.

(21) Appl. No.: 14/698,757

(22) Filed: Apr. 28, 2015

Related U.S. Application Data

(60) Provisional application No. 61/986,031, filed on Apr. 29, 2014.

(51) Int. Cl.
| | | |
|---|---|---|
| *H04L 9/30* | (2006.01) | |
| *G06F 17/17* | (2006.01) | |
| *G06F 7/58* | (2006.01) | |

(52) U.S. Cl.
CPC ............. *H04L 9/302* (2013.01); *G06F 7/582* (2013.01); *G06F 17/17* (2013.01)

(58) Field of Classification Search
CPC ......... H04L 9/30; H04L 9/302; H04L 9/3033; G06F 7/582; G06F 7/584; G06F 7/586; G06F 17/17; G06F 17/18
USPC ........... 708/200, 250, 254; 380/30, 282, 285
See application file for complete search history.

(56) References Cited

U.S. PATENT DOCUMENTS

| | | | | |
|---|---|---|---|---|
| 5,201,000 A | * | 4/1993 | Matyas | G06F 9/30003 380/30 |
| 7,715,554 B1 | * | 5/2010 | Lepe | H04L 9/00 380/30 |
| 2002/0186837 A1 | * | 12/2002 | Hopkins | H04L 12/5692 379/399.01 |
| 2005/0063539 A1 | * | 3/2005 | Langin-Hooper | G06F 7/586 380/44 |
| 2011/0142231 A1 | * | 6/2011 | Takeda | G06F 7/72 380/30 |
| 2013/0304779 A1 | * | 11/2013 | Lu | H04L 9/3033 708/250 |

OTHER PUBLICATIONS

Szpiro, George G. ("The gaps between the gaps: some patterns in the prime number sequence" published on Physica A: Statistical Mechanics and its Applications, vol. 341, Oct. 1, 2004, pp. 607-617).*

Szpiro, George G. ("Peaks and gaps: Spectral analysis of the intervals between prime numbers", published on Physica A: Statistical Mechanics and its Applications, vol. 384, Issue 2, Oct. 15, 2007, pp. 291-296).*

Ares, S. ("Hidden structure in the randomness of the prime number sequence?" published on Physica A: Statistical Mechanics and its Applications vol. 360, Issue 2, Feb. 1, 2006, pp. 285-296).*

Qing ("The Large Prime Numbers Generation of RSA Algorithm Based on Genetic Algorithm", published in Intelligence Science and Information Engineering (ISIE), 2011 International Conference, on Aug. 30, 2011).*

* cited by examiner

*Primary Examiner* — Matthew D Sandifer
(74) *Attorney, Agent, or Firm* — JDI Patent; Joshua D. Isenberg; Robert Pullman

(57) ABSTRACT

A regression on a prime-indexed-prime finite difference generator function is used to predict prime numbers. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

10 Claims, 1 Drawing Sheet

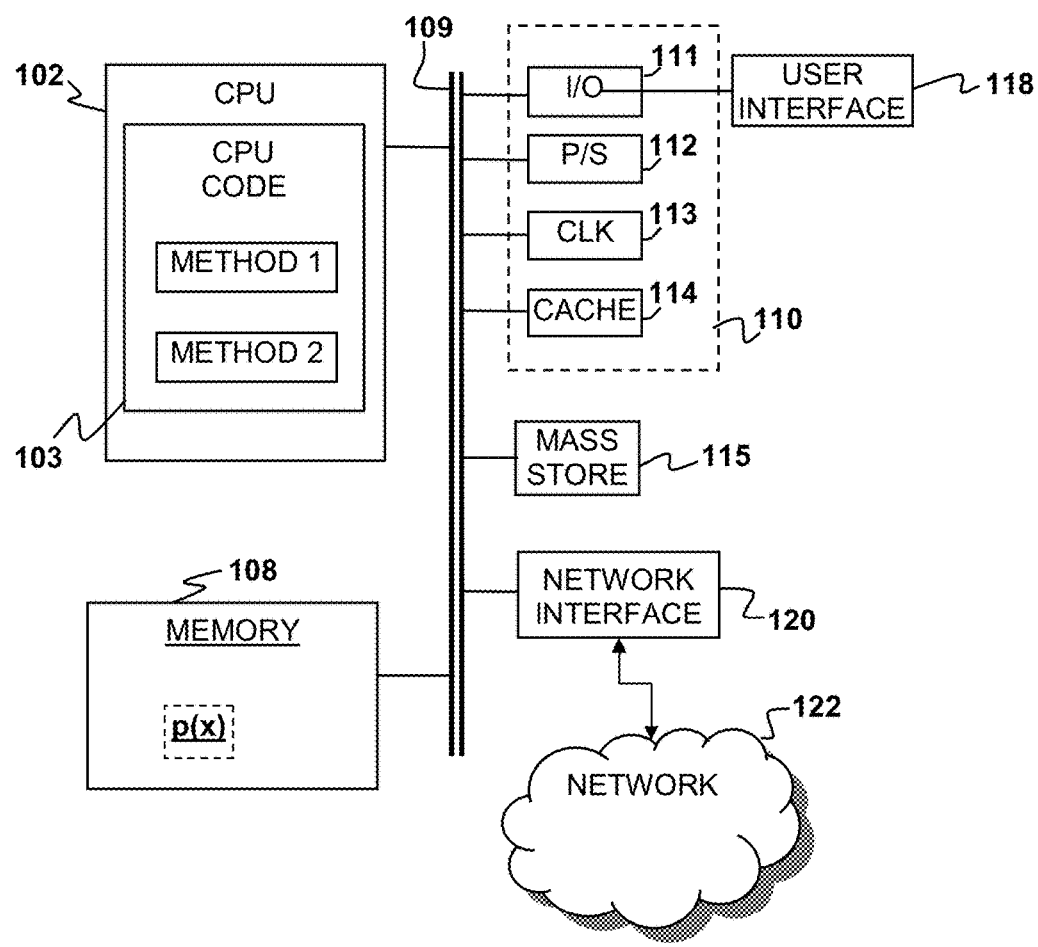

US 10,432,398 B1

PRIME NUMBER PREDICTION

CLAIM OF PRIORITY

This application claims the priority benefit of U.S. Provisional Application No. 61/986,031 filed Apr. 29, 2014, the entire contents of which are incorporated herein by reference.

FIELD OF THE DISCLOSURE

Aspects of the present disclosure are related to prime numbers and more particularly to applications practical applications involving factorization of prime numbers.

BACKGROUND

Prime numbers have many applications in applied mathematics. As is generally understood by those skilled in the arts of mathematics and applied mathematics, a prime number is a natural number greater than 1 having no positive divisors other than 1 and itself. A natural number greater than 1 that is not a prime number is called a composite number.

Around 300 BC, the Greek mathematician Euclid demonstrated that there are infinitely many primes. There is no known useful formula that sets apart all of the prime numbers from composites. However, the statistical behavior of primes can be modelled. For example, the prime number theorem, proven at the end of the 19th century, says that the probability that a given, randomly chosen number n is prime is inversely proportional to its number of digits, or to the logarithm of n.

Until recently, number theory in general, and the study of prime numbers in particular, was seen as the canonical example of pure mathematics, with no applications outside of the self-interest of studying the topic. This changed in the 1970's with the development of the use of prime numbers as a basis for the creation of public key cryptography algorithms.

RSA is one of the first practicable public-key cryptosystems and is widely used for secure data transmission. In such a cryptosystem, the encryption key is public and differs from the decryption key which is kept secret. In RSA, this asymmetry is based on the practical difficulty of factoring the product of two large prime numbers. A user of RSA creates and then publishes the product of two large prime numbers, along with an auxiliary value, as their public key. The prime factors must be kept secret. Anyone can use the public key to encrypt a message, but with currently published methods, if the public key is large enough, only someone with knowledge of the prime factors can feasibly decode the message.

More recently, in the field of computing, prime numbers have been used for hash tables and pseudorandom number generators. A hash table (also hash map) is a data structure used to implement an associative array, a structure that can map keys to values. A hash table uses a hash function to compute an index into an array of buckets or slots, from which the correct value can be found. Ideally, the hash function assigns each key to a unique bucket, but this situation is rarely achievable in practice (usually some keys will hash to the same bucket). Instead, most hash table designs assume that hash collisions—different keys that are assigned by the hash function to the same bucket—will occur and must be accommodated in some way.

A pseudorandom number generator (PRNG), also known as a deterministic random bit generator (DRBG), is an algorithm for generating a sequence of numbers that approximates the properties of random numbers. In terms of random number generation, the sequence is not truly random in that it is completely determined by a relatively small set of initial values, called the PRNG's state, which includes a truly random seed. Although sequences that are closer to truly random can be generated using hardware random number generators, pseudorandom numbers are important in practice for their speed in number generation and their reproducibility. PRNGs are central in applications such as simulations (e.g. of physical systems via the Monte Carlo method), in procedural generation, and in cryptography.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIG. 1 is a block diagram of a computer processing system in accordance with aspects of the present disclosure.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Aspects of the present disclosure are related to the distribution of a category of prime numbers referred to herein as prime-indexed primes. A prime-indexed prime $q_i$ is generally defined as follows:

"If $p_i$ is the ith prime, then we define $q_i$ to be $p_{p_i}$."

To address the value of $q_i$ for any positive integer i as well as the number of iterations of prime indexing, $q_i$ can be redefined with the augmentation additional indexed parameters as follows:

$$q_{si}^k = q_s^k(i) = \begin{cases} i = 1, 2, \ldots & \text{if } k = 0, \\ p_i, & \text{if } k = 1, \\ p_{p_i}, & \text{if } k = 2, \\ \vdots & \vdots \\ p_{p \cdots p_i}, & \text{if } k > 2 \end{cases}$$

In the above equation i={1, 2, ... } and is the index of $q_s^k(i)$, k is a natural number representing the prime-index order, and s is a shift parameter of the index set of $q_s^k(i)$.

Aspects of the present disclosure utilize finite differences of prime-index primes (PIPs) of the type described above. In particular, aspects of the present disclosure involve obtaining families of sequences by taking the finite differences of PIPs using a generalized $n^{th}$ order prime-indexed-prime finite difference generator function ⊐ (daleth) defined as follows:

$$\text{daleth}(h, n)\{q\}(s, k, i) =$$

$$\daleth_{hsi}^{nk} = \Delta_h^n(q_{si}^k) = \Delta_h^n[q_s^k](i) = \sum_{m=0}^{n} (-1)^m \binom{n}{m} q_s^k(i + (n-m)h),$$

In the above equation, h is a spacing parameter, and n and m are binomial coefficients.

The properties of the above prime-indexed-prime finite difference function and the distribution of prime-indexed primes can be determined using the techniques described in the paper "A PRIME FRACTAL AND GLOBAL QUASI-SELF-SIMILAR STRUCTURE IN THE DISTRIBUTION OF PRIME-INDEXED PRIMES", by Robert G. Batchko, May 10, 2014, the entire contents of which are incorporated herein by reference.

Analysis of the above prime-indexed-prime finite difference function, ⊐ (daleth), described in the above paper shows that the distribution of the prime-indexed primes, and hence ⊐ (daleth), have a fractal nature with scaling by prime-index order k.

The fractality of ⊐ (daleth) may be of relevance in other areas of mathematics and science, such as refining the accuracy of approximating large primes. Likewise, it may be useful in improving the efficiency of factoring large primes, the difficulty of which is critical to RSA public key data encryption.

Example—Public Key Encryption/Decryption

As an example, the fractality of ⊐ (daleth) can be used in factoring large primes in applications such as public key data encryption, such as RSA. Public-key cryptography algorithms use prime factorization as a trapdoor one-way function. Such algorithms define a number n as the product of prime numbers p and q, i.e., n=pq. Using the RSA system, the identity of the sender can be identified as genuine without revealing his private code.

The RSA algorithm defines a private key d and a public key e such that $$de \equiv 1 (\text{mod } \phi(n))$$

$$(e\phi(n)) = 1,$$

where $\phi(n)$ is the totient function, (a,b) denotes the greatest common divisor (so (a,b) means that a and b are relatively prime), and a≡b(mod m) is a congruence.

The message is converted to a number M. The sender of the message makes n and e public and sends $$E = M^e (\text{mod } n) \text{ to a receiver.}$$

To decode, the receiver (who knows d) computes $$E^d = (M^e)^d = M^{ed} = M^{N\phi(n)+1} = M(\text{mod } n), \text{ since } N \text{ is an integer.}$$

In order to crack the code, d must be found. But this requires factorization of n since $$\phi(n) = (p-1)(q-1)$$

To defeat attempts to decrypt the message, both p and q are picked so that p±1 and q±1 are divisible by large prime numbers, since otherwise factorization methods, such as the Pollard p−1 factorization method or Williams p+1 factorization method, could be used to potentially factor n easily. It is also desirable for $\phi(\phi(pq))$ to be large and divisible by large primes.

It is possible to break the cryptosystem by repeated encryption if a unit of ⊐/$\phi$(n) ⊐ has small field order, where ⊐/s ⊐ is the ring of integers between 0 and s−1 under addition and multiplication (mod³). It has been shown that "almost" every encryption exponent e is safe from breaking using repeated encryption for factors of the form:

$$p = 2p_1 + 1$$

$$q = 2q_1 + 1$$

where:

$$p_1 = 2p_2 + 1$$

$$q_1 = 2q_2 + 1$$

and p, $p_1$, $p_2$, q, $q_1$, and $q_2$ are all primes. In this case, $$\phi(n) = 4p_1 q_1$$

$$\phi\phi(n) = 8p_2 q_2$$

It has been suggested that $p_2$ and $q_2$ should be of order $10^{75}$ (i.e., a 1 followed by 75 zeroes). Applications involving the use of the distribution of prime-indexed primes.

According to aspects of the present disclosure the $x^{th}$ prime, p(x) can be predicted using regression over a single prime index order according to the following method.

Method 1. Prediction of the xth Prime, p(x) Using Regression Over a Single Prime-Index Order.

1. Select a first index set consisting of ordered consecutive positive integers x, where x={m, m+1, ..., m+n} and m and n are positive integers;
2. Find the ordered list of prime numbers indexed by the elements of x, p(x)={p(m), p(m+1), ..., p(m+n)};
3. Find the ordered list of prime-indexed prime numbers indexed by the elements of x, p(p(x))={p(p(m)), p(p(m+1)), ..., p(p(m+n))};
4. Perform a forward second-order finite differencing operation on the list p(x), thereby producing a list of second-order finite-differenced p(x) values, $\Delta^2 p(x)$, where $\Delta^2 p(i) = p(i+2) - 2p(i+1) + p(i)$ for the ith element in x;
5. Perform a forward second-order finite differencing operation on the list p(p(x)), thereby producing a list of second-order finite-differenced p(p(x)) values, $\Delta^2 p(p(x))$, where $\Delta^2 p(p(i)) = p(p(i+2)) - 2p(p(i+1)) + p(p(i))$ for the $i^{th}$ element in x;
6. Perform an linear regression of $\Delta^2 p(p(x))$ regressed on $\Delta^2 p(x)$, where $\Delta^2 p(x)$ is the independent variable and $\Delta^2 p(p(x))$ is the dependent variable;

7. From the linear regression, derive coefficients a0 and a1, where a0 is the y-intercept and a1 is the slope of the equation for a line;
8. Select a second index set consisting of ordered consecutive positive integers z, where z={r, r+1, . . . , r+s} and r and s are positive integers;
9. Find the ordered list of prime numbers indexed by the elements of z, p(z)={p(r), p(r+1), . . . , p(r+s)};
10. Perform a forward second-order finite differencing operation on the list p(z), thereby producing a list of second-order finite-differenced p(z) values, $\Delta^2 p(z)$, where $\Delta^2 p(j)=p(j+2)-2p(j+1)+p(j)$ for the $j^{th}$ element in z;
11. Using $\Delta^2 p(z)$ and independent variable, a0 as the slope and a1 as the y-intercept in the equation for a line, derive a list of predicted dependent values $E\{\Delta^2 p(p(z))\}$;
12. Perform the inverse of the second-order finite-differencing operation on $E[\Delta^2 p(p(z))]$, thereby deriving a list of predicted prime-indexed prime values $E\{p(p(z))\}$, where $E[p(p(j))]=E[p(p(j+2))-p(p(j+1))+p(p(j))]$ for the jth element in z;
13. Process, store and transmit one or more elements of $E\{p(p(z))\}$;
14. Used the list $E[p(p(z))]$ or elements thereof for forecasting or extrapolating the values of large primes or as a refinement to estimated bounds of large primes found in any known method of predicting prime numbers.

Method 2. Prediction of the xth Prime, p(x) Using Regression Over Multiple Prime-Index Orders.
1. Pick a number, x, and calculate the upper and lower bounds for p(x) using state-of-the-art asymptotic expressions;
2. Using the prime-indexed primes (PIPs), q, select values of s (prime-index-prime shift), and k (prime-index order) such that q(s,k,i)=x.
3. Then, by the definition of the PIPs, we have: q(s,k+1,i)=p(x).
4. Using known sieve or other technology, find the values of q(s,k,i), q(s,k−1,i), q(s,k−2,i) . . .
5. Perform regressions on a prime-indexed-prime finite difference generator function daleth(h,n) {q} (s,k,i) daleth(h,n){q}(s,k−1,i) where appropriate values of h (finite difference spacing) and n (finite difference order) are also selected.
6. Forward, central, or backward finite differencing may be used in the calculations of the prime-indexed-prime finite difference generator function daleth as desired;
7. Use linear, quadratic, exponential or any other appropriate model for the regressions. From the regressions, derive fitting functions and coefficients for daleth(h,n) {q} (s,k,i) daleth(h,n) {q} (s,k−1,i).
8. From these functions, extrapolate a fitting function for daleth(h,n) {q} (s,k+1,i).
9. From the definitions of daleth and q, an estimated value for p(x) can be derived.
10. The derived value of p(x) can them be used as a refinement to any state-of-the-art asymptotic expressions for bounds for the nth prime, p(x);
11. The derived value of p(x) can then be processed, stored, or transmitted.

According to an aspect of the present disclosure a computing device can be configured to process, store or receive the $x^{th}$ prime as follows.

Device 1. Device for Processing, Storing, Transmitting or Receiving the xth Prime A computational processor capable of processing can be configured, e.g., by suitable software programming to perform the following steps:
for a number x, calculating the $x^{th}$ prime, p(x) using asymptotic expressions for upper and lower bounds of p(x):
using prime-indexed primes (PIPs), q, to select values of s (prime-index-prime shift), and k (prime-index order) such that q(s,k−1,i)=x, whereby q(s,k,i)=p(x);
using known sieve or other appropriate technology, finding the values of q(s,k,i−1), q(s,k,i−2) . . . ;
performing a regression on a prime-indexed-prime finite difference generator function daleth(h,n) {q} (s,k,i−1) daleth(h,n) {q} (s,k,i−2) . . . where appropriate values of h (finite difference spacing) and n (finite difference order) are also selected;
from the regressions, deriving a fitting function and coefficients for the general expression daleth(h,n) {q} (s,k,j) where j=1, 2, . . .
from the fitting function, predicting a value for the a prime-indexed-prime finite difference generator function daleth(h,n) {q} (s,k,i);
from the definitions of daleth and q, deriving an estimated value for p(x);
using the derived value of p(x) as a refinement to estimated bounds of p(x); and
processing, storing, or transmitting the derived value of p(x).

The computational processor is configured to be capable of storing derived number p(x); or
The computational processor is configured to be capable of transmitting derived number p(x); or
The computational processor is configured to be capable of receiving a number, which may include a derived number p(x).

According to an alternative aspect of the present disclosure a computing device can be configured to process, store, transmit or receive the $x^{th}$ prime as follows.

Device 2. Device for Processing, Storing, Transmitting or Receiving the $x^{th}$ Prime A computational processor capable of processing and performing the following steps:
for a number x, calculating the $x^{th}$ prime, p(x) using asymptotic expressions for upper and lower bounds of p(x);
using prime-indexed primes (PIPs), q, to select values of s (prime-index-prime shift), and k (prime-index order) such that q(s,k,i)=x, whereby q(s,k+1,i)=p(x);
finding values of q(s,k,i), q(s,k−1,i), q(s,k−2,i) . . . ;
perform regressions on a prime-indexed-prime finite difference generator
function daleth(h,n) {q} (s,k,i) daleth(h,n) {q} (s,k−1,i) where appropriate values of h (finite difference spacing) and n (finite difference order) are also selected;
from the regressions, deriving fitting functions and coefficients for daleth(h,n) {q} (s,k,i) daleth(h,n) {q} (s,k−1,i);
from the fitting functions and coefficients, extrapolating a fitting function for daleth(h,n) {q} (s,k+1,i);
from definitions of daleth and q, deriving an estimated value for p(x);
using the derived value of p(x) as a refinement to asymptotic expressions for bounds for the $x^{th}$ prime, p(x); and
processing, storing, or transmitting the derived value of p(x);

The computational processor is configured to be capable of storing derived number p(x); or The computational processor is configured to be capable of transmitting derived number p(x); or The computational processor is configured to be capable of receiving a number, which may include a derived number p(x).

Aspects of the present disclosure include computer processing systems that are configured to implement prime number prediction in accordance with the above-described methods. By way of example, and not by way of limitation, FIG. 1 illustrates a block diagram of a computer system 100 that may be used to implement graphics processing according to aspects of the present disclosure. According to aspects of the present disclosure, the system 100 may be an embedded system, mobile phone, personal computer, tablet computer, portable game device, workstation, game console, and the like.

The system 100 generally may include a central processor unit (CPU) 102, and a memory 108 that is accessible to the CPU. The CPU 102 may include one or more processor cores, e.g., a single core, two cores, four cores, eight cores, or more. The memory 108 may be in the form of an integrated circuit that provides addressable memory, e.g., RAM, DRAM, and the like. The memory 108 may store resources and buffers 405 of data. The data may include derived prime numbers p(x)

By way of example, and not by way of limitation, the CPU 102 may access the memory 108 using a data bus 109. In some cases, it may be useful for the system 100 to include two or more different buses. The memory 108 may contain data that can be accessed by the CPU 102 and/or results of computations performed by the CPU.

The CPU may be configured to execute CPU code 103, which may include an application that predicts prime numbers, e.g., as described above with respect to Method 1 or Method 2. The CPU code 103 may also implement public key encryption (e.g., RSA) that uses prime numbers generated from the predicted prime number values p(x). The CPU code 103 may alternatively implement physics simulations (e.g., Monte Carlo simulations) and other functions using prime numbers generated from the predicted prime number values p(x).

By way of example, and not by way of limitation, the functions of the system 100 may alternatively be implemented by special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:

One or more processor cores (e.g., microcontroller, microprocessor or digital signal processor (DSP) cores.

Memory blocks, e.g., read only memory (ROM), random access memory (RAM), electrically erasable programmable read-only memory (EEPROM) and flash memory.

Timing sources, such as oscillators or phase-locked loops.

Peripherals, such as counter-timers, real-time timers, or power-on reset generators.

External interfaces, e.g., industry standards such as universal serial bus (USB), FireWire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

In some implementations, some or all of the functions of the system 100 may be implemented by appropriately configured software instructions executed by a software programmable general purpose computer processor, e.g., as software instructions executed by the CPU 102. Such instructions may be embodied in a computer-readable medium, e.g., memory 108, or a storage device 115.

The system 400 may also include well-known support functions 110, which may communicate with other components of the system, e.g., via the bus 109. Such support functions may include, but are not limited to, input/output (I/O) elements 111, power supplies (P/S) 112, a clock (CLK) 113 and cache 114.

The system 100 may include the display device 116 to present rendered graphics to a user. In alternative implementations, the display device 116 is a separate component that works in conjunction with the system, 100. The display device 116 may be in the form of a flat panel display, head mounted display (HMD), cathode ray tube (CRT) screen, projector, or other device that can display visible text, numerals, graphical symbols or images. The system 100 may optionally include a mass storage device 115 such as a disk drive, CD-ROM drive, flash memory, tape drive, or the like to store programs and/or data. The system 100 may also optionally include a user interface unit 118 to facilitate interaction between the system 100 and a user. The user interface 118 may include a keyboard, mouse, joystick, light pen, game controller, or other device that may be used in conjunction with a graphical user interface (GUI).

The system 100 may also include a network interface 120 to enable the device to communicate with other devices over a network 122. The network 122 may be, e.g., a local area network (LAN), a wide area network such as the internet, a personal area network, such as a Bluetooth network or other type of network. These components may be implemented in hardware, software, or firmware, or some combination of two or more of these.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

In accordance with aspects of the present disclosure, the components, process steps, and/or data structures may be implemented using various types of operating systems; computing platforms; user interfaces/displays, including personal or laptop computers, video game consoles, PDAs and other handheld devices, such as cellular telephones, tablet computers, portable gaming devices; and/or general purpose machines. In addition, those of ordinary skill in the art will recognize that devices of a less general purpose nature, such as hardwired devices, field programmable gate arrays (FOGs), application specific integrated circuits (ASICs), or the like, may also be used without departing from the scope and spirit of the inventive concepts disclosed herein.

Additional Aspects

Another additional aspect is a graphics processing system configured to implement the foregoing methods.

Yet another additional aspect is a computer-readable medium having computer executable instructions embodied therein that, when executed, implement the foregoing methods.

A further aspect is an electromagnetic or other signal carrying computer-readable instructions for performing the foregoing methods.

A computer program product downloadable from a communication network and/or stored on a computer-readable and/or microprocessor-executable medium, characterized in that it comprises program code instructions for implementing the foregoing methods.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
receiving a message requiring public key encryption;
converting the message to a number M and generating an encrypted message E where $E=M^e(\mod n)$, wherein e is at least a part of a public key and d is a private key, wherein d and e are related by $de \equiv (1 \mod (\text{totient}(n)))$ and $(e\ (\text{totient}(n)))=1$, wherein n is a product of two predicted prime numbers computed by:
for a first index set consisting of a range of consecutive positive integers x, finding a list of prime numbers, $p(x)$;
using prime-indexed primes (PIPs), $q(s,k,x)$, to select values of s (prime-index-prime shift), and k (prime-index order), whereby $q(s,1,x)=p(x)$, $q(s,2,x)=p(p(x))$, and so on finding a list of PIPs $q(s,2,x)$;
performing an $n^{th}$-order finite difference operation on the lists $q(s,1,x)$ and $q(s,2,x)$ to generate lists $\Delta(h,n)\{q\}(s,1,x)$ and $\Delta(h,n)\{q\}(s,2,x)$, where $\Delta$ is a finite difference operator, h is a finite difference spacing parameter, and n is an order of finite differencing;
performing a regression of $\Delta(h,n)\{q\}(s,2,x)$ on $\Delta(h,n)\{q\}(s,1,x)$
from the regression of $\Delta(h,n)\{q\}(s,2,x)$ on $\Delta(h,n)\{q\}(s,1,x)$, deriving a fitting function and coefficients for the fitting function;
from the fitting function and from a second index set consisting of a range of consecutive positive integers z, deriving a list of predicted finite-differenced PIPs $E[\Delta(h,n)\{q\}(s,2,z)]$;
performing an inverse $n^{th}$-order finite difference operation on the list $E[\Delta(h,n)\{q\}(s,2,z)]$, thereby deriving a list of predicted PIPs $E[q(s,2,z)]$;
using the derived list $E[q(s,2,z)]$ as a means of forecasting, predicting, or refining estimated bounds of $q(s,2,x)$; and
predicting prime numbers of at least order $10^{75}$ from the derived values of x and $E[\Delta(h,n)\{q\}(s,2,x)]$ and/or $E[q(s,2,x)]$ and;
sending the encrypted message over a network.

2. An apparatus, comprising:
a computational processor; and
a memory coupled to the computational processor, the memory having computer readable instructions embodied therein, the instructions being configured, upon execution by the computational processor, to implement the method of claim 1.

3. A non-transitory computer-readable medium having computer executable instructions embodied therein that, when executed, implement the method of claim 1.

4. A method, comprising:
receiving a message requiring public key encryption;
converting the message to a number M and generating an encrypted message E where $E=M^e(\mod n)$, wherein e is at least a part of a public key and d is a private key, wherein d and e are related by $de \equiv (1 \mod (\text{totient}(n)))$ and $(e\ (\text{totient}(n)))=1$, wherein n is a product of two predicted prime numbers computed by:
for a number x, calculating the $x^{th}$ prime, $p(x)$, wherein $p(x)$ is at least of order $10^{75}$ using asymptotic expressions for upper and lower bounds of $p(x)$;
using prime-indexed primes (PIPs), q, to select values of s (prime-index-prime shift), and k (prime-index order) such that $q(s,k,i)=x$, whereby $q(s,k+1,i)=p(x)$;
finding values of $q(s,k,i)$, $q(s,k-1,i)$, $q(s,k-2,i)$ . . . ;
perform regressions on a prime-indexed-prime finite difference generator function $\text{daleth}(h,n)\{q\}(s,k,i)$ $\text{daleth}(h,n)\{q\}(s,k-1,i)$ where values of h (finite difference spacing) and n (finite difference order) are also selected;
from the regressions, deriving fitting functions and coefficients for $\text{daleth}(h,n)\{q\}$ $(s,k,i)$ $\text{daleth}(h,n)\{q\}$ $(s,k-1,i)$;
from the fitting functions and coefficients, extrapolating a fitting function for $\text{daleth}(h,n)\{q\}$ $(s,k+1,i)$;
from definitions of daleth and q, deriving an estimated value for $p(x)$;

using the derived value of p(x) as a refinement to asymptotic expressions for bounds for the $x^{th}$ prime, p(x); and sending the encrypted message over a network.

5. The method of claim 4 wherein performing regressions on a prime-indexed-prime finite difference generator function includes using linear, quadratic, exponential or any other model for the regressions.

6. An apparatus, comprising:

a computational processor; and a memory coupled to the computational processor, the memory having computer readable instructions embodied therein, the instructions being configured, upon execution by the computational processor, to implement a public key encryption method comprising:

receiving a message requiring public key encryption;

converting the message to a number M and generating an encrypted message E where $E=M^e \pmod{n}$, wherein e is at least a part of a public key and d is a private key, wherein d and e are related by de≡(1 mod (totient(n))) and (e (totient(n)))=1, wherein n is a product of least two predicted prime numbers computed by:

for a number x, calculating the $x^{th}$ prime, p(x) using asymptotic expressions for upper and lower bounds of p(x);

using prime-indexed primes (PIPs), q, to select values of s (prime-index-prime shift), and k (prime-index order) such that q(s,k,i)=x, whereby q(s,k+1,i)=p(x);

finding values of q(s,k,i), q(s,k-1,i), q(s,k-2,i) . . . ;

perform regressions on a prime-indexed-prime finite difference generator function daleth(h,n){q}(s,k,i) daleth(h,n){q}(s,k-1,i) where values of h (finite difference spacing) and n (finite difference order) are also selected;

from the regressions, deriving fitting functions and coefficients for daleth(h,n){q}(s,k,i) daleth(h,n){q}(s,k-1,i);

from the fitting functions and coefficients, extrapolating a fitting function for daleth(h,n){q}(s,k+1,i);

from definitions of daleth and q, deriving an estimated value for p(x);

using the derived value of p(x) as a refinement to asymptotic expressions for bounds for the $x^{th}$ prime, p(x), wherein the derived value of p(x) is of at least order $10^{75}$; and wherein said computational processor is configured to send the encrypted message over a network.

7. A non-transitory computer-readable medium having computer executable instructions embodied therein that, when executed, implement a method comprising:

receiving a message requiring public key encryption;

converting the message to a number M and generating an encrypted message E where $E=M^e \pmod{n}$, wherein e is at least a part of a public key and d is a private key, wherein d and e are related by de≡(1 mod (totient(n))) and (e (totient(n)))=1, wherein n is a product of two predicted prime numbers computed by:

for a number x, calculating the $x^{th}$ prime, p(x) using asymptotic expressions for upper and lower bounds of p(x):

using prime-indexed primes (PIPs), q, to select values of s (prime-index-prime shift), and k (prime-index order) such that q(s,k-1,i)=x, whereby q(s,k,i)=p(x);

finding the values of q(s,k,i-1), q(s,k,i-2) . . . ;

performing a regression on a prime-indexed-prime finite difference generator function daleth(h,n){q}(s,k,i-1) daleth(h,n){q}(s,k,i-2) . . . where values of h (finite difference spacing) and n (finite difference order) are also selected;

from the regressions, deriving a fitting function and coefficients for the general expression daleth(h,n){q}(s,k,j) where j=1, 2, . . .

from the fitting function, predicting a value for the a prime-indexed-prime finite difference generator function daleth(h,n){q}(s,k,i);

from the definitions of daleth and q, deriving an estimated value for p(x), wherein the derived estimated value for p(x) is at least of order $10^{75}$;

using the derived estimated value of p(x) as a refinement to estimated bounds of p(x); and sending the encrypted message over a network.

8. A method, comprising:

receiving a message requiring public key encryption;

converting the message to a number M and generating an encrypted message E where $E=M^e \pmod{n}$, wherein e is at least a part of a public key and d is a private key, wherein d and e are related by de≡(1 mod (totient(n))) and (e (totient(n)))=1, wherein n is a product of two predicted prime numbers computed by:

for a number x, estimating a value of the $x^{th}$ prime, p(x):

using prime-indexed primes (PIPs), q, to select values of s (prime-index-prime shift), and k (prime-index order) such that q(s,k-1,i)=x, whereby q(s,k,i)=p(x);

finding the values of q(s,k,i-1), q(s,k,i-2) . . . ;

performing a regression on a prime-indexed-prime finite difference generator function daleth(h,n){q}(s,k,i-1) daleth(h,n){q}(s,k,i-2) . . . where appropriate values of h (finite difference spacing) and n (finite difference order) are also selected;

from the regression, deriving a fitting function and coefficients for the general expression daleth(h,n){q}(s,k,j) where j=1, 2, . . .

from the fitting function, predicting a value for the a prime-indexed-prime finite difference generator function daleth(h,n){q}(s,k,i);

from the definitions of daleth and q, deriving an estimated value for p(x), wherein the derived estimated value for p(x) is at least of order $10^{75}$; and sending the encrypted message over a network.

9. The method of claim 8, further comprising processing, storing, or transmitting the derived value of p(x).

10. The method of claim 8 wherein performing regressions on a prime-indexed-prime finite difference generator function includes using a linear, quadratic, or exponential model for the regressions.

* * * * *